Patented July 20, 1943

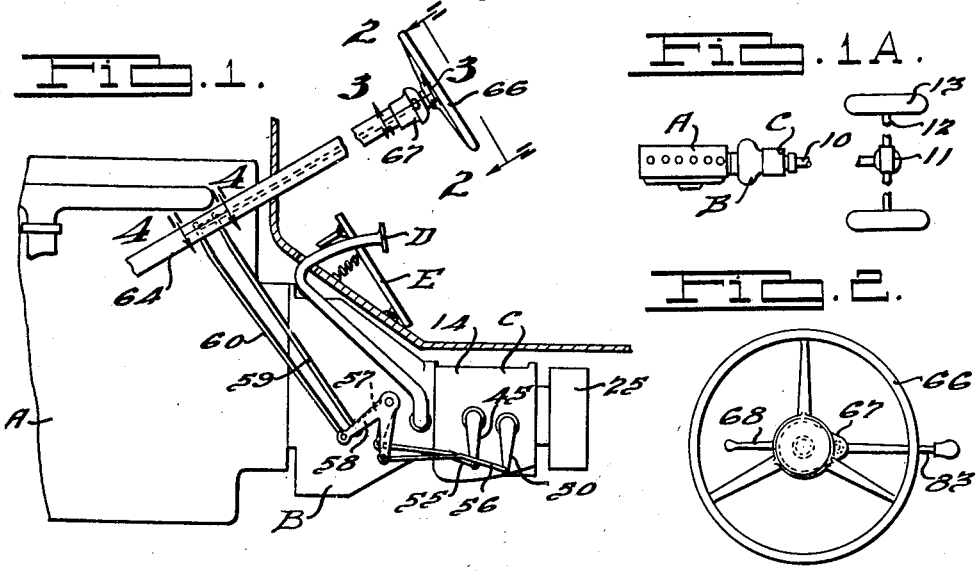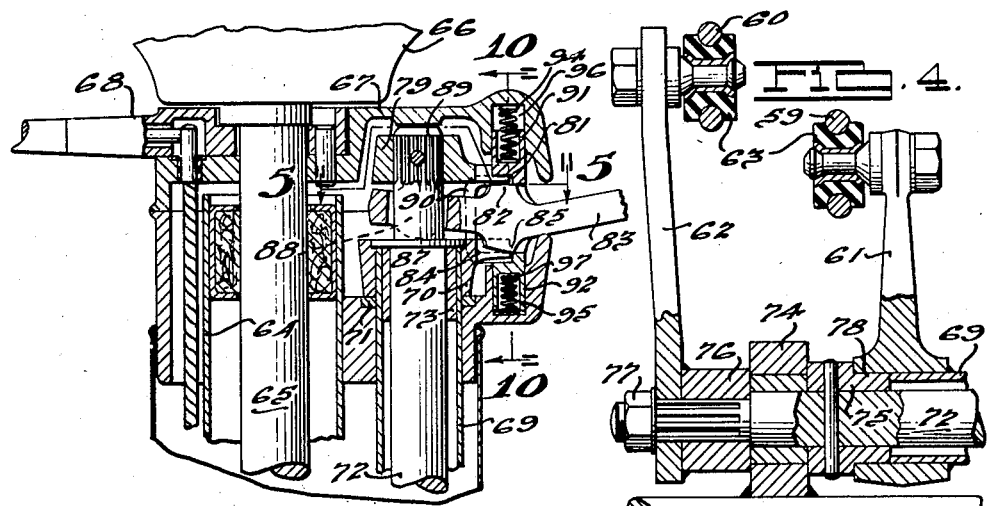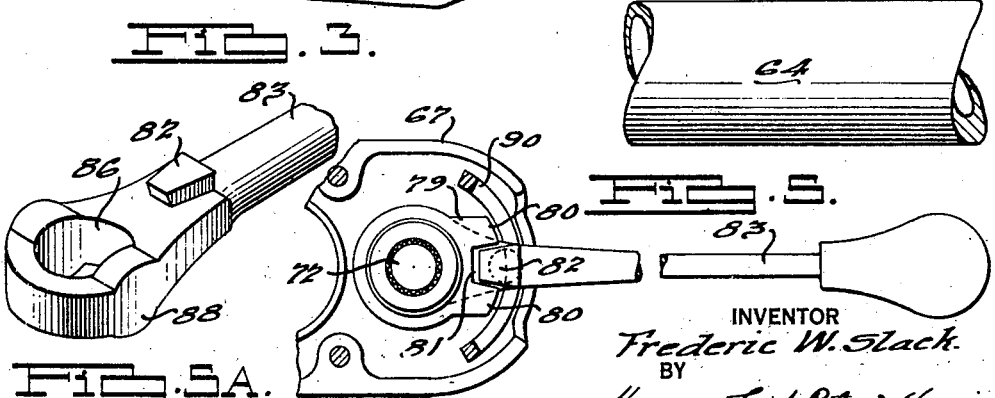

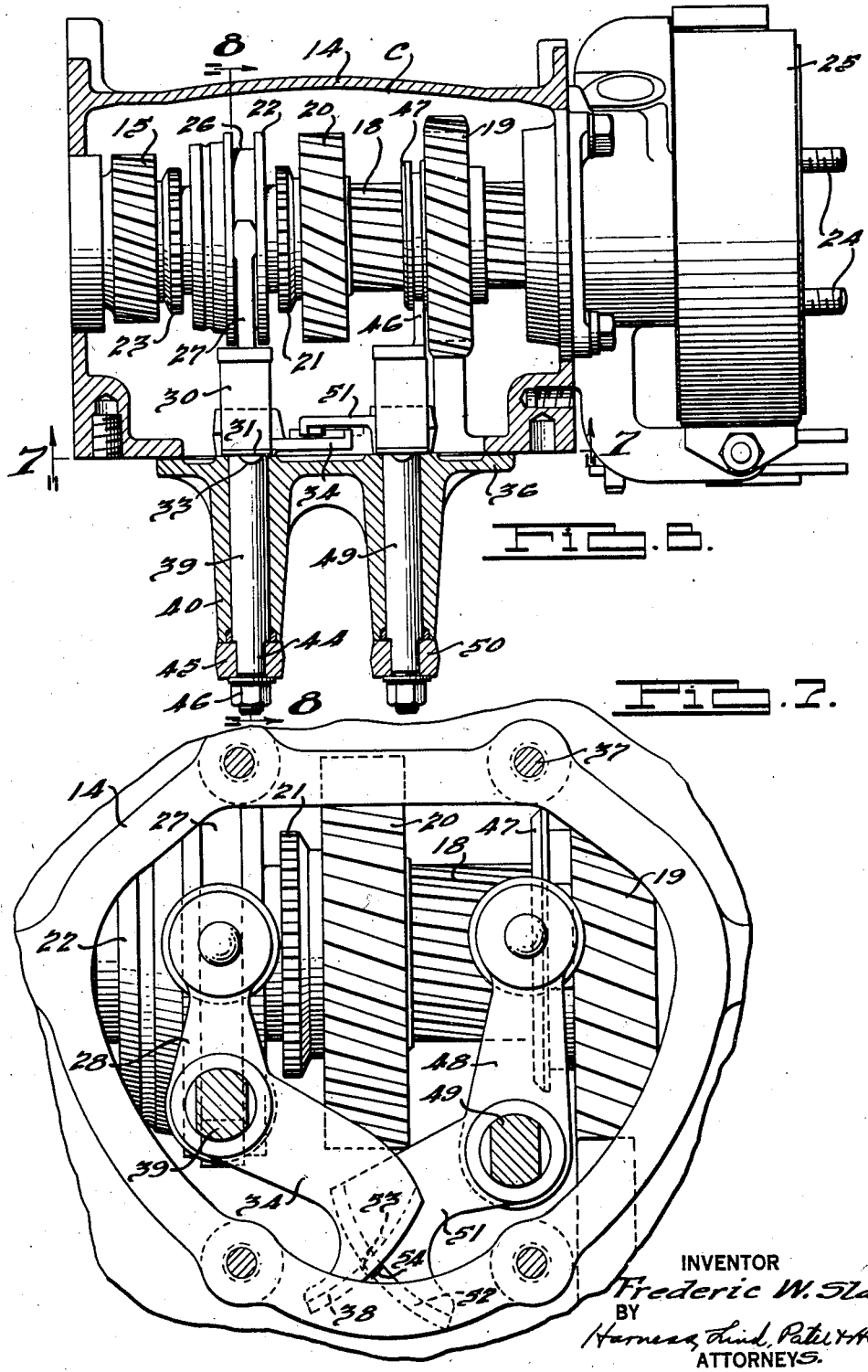

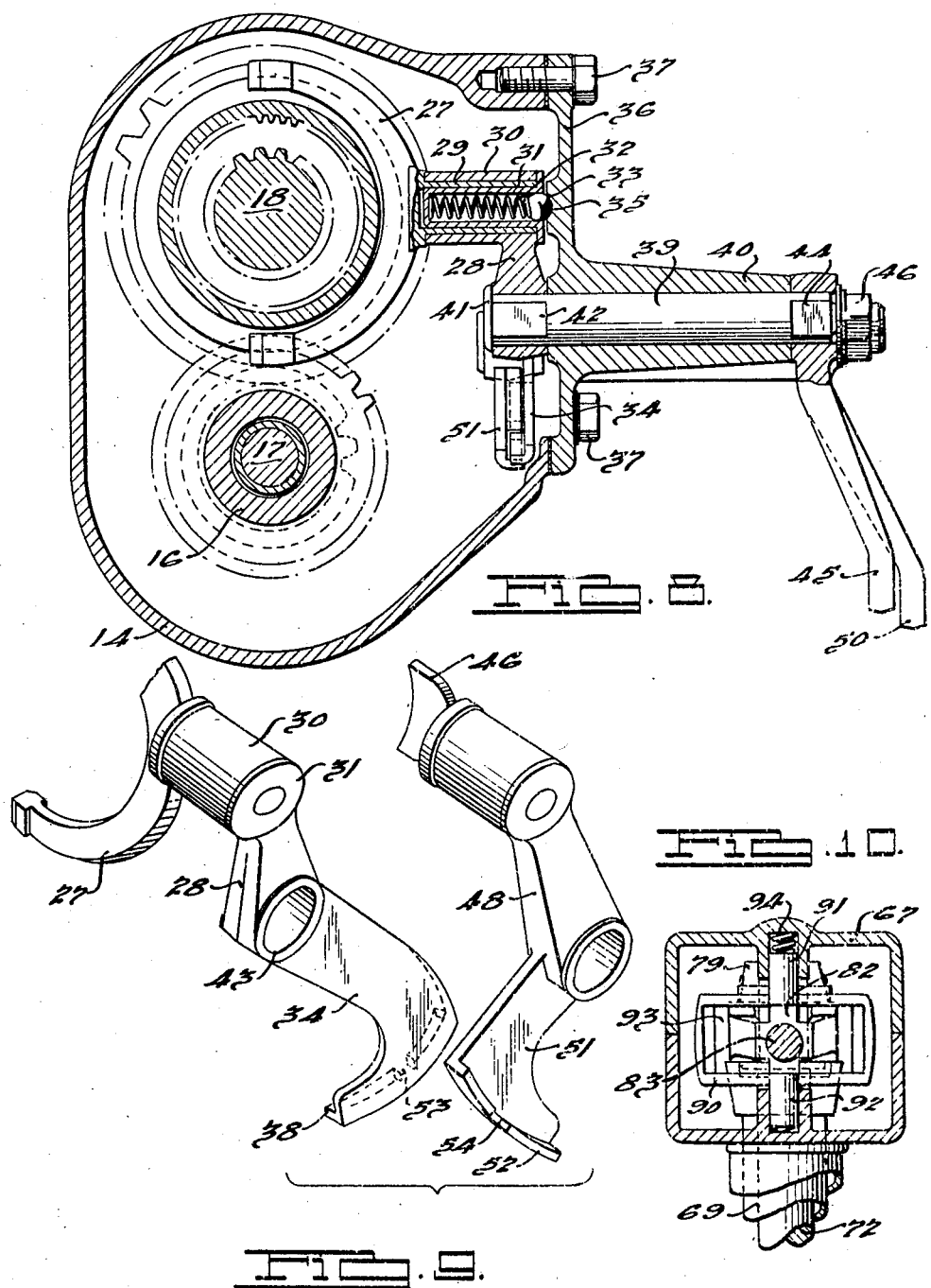

2,324,732

UNITED STATES PATENT OFFICE 2,324,732

POWER TRANSMISSION

Frederic W. Slack, Detroit, Mich., assignor to Chrysler Corporation, Highland Park, Mich., a corporation of Delaware Application April 7, 1941, Serial No. 387,141

2 Claims. (Cl. 74—477)

This invention relates to vehicle transmissions and shift mechanism for controlling the same.

It relates particularly to an improved mechanism for controlling vehicle transmissions which is adapted for mounting at a point remote from the transmission itself.

The principal object of the invention is to provide a shifting mechanism that is both positive and easy of operation and economical to manufacture.

Another object is to provide a shift mechanism in which the cross-over mechanism is positioned at the top of the steering column wherein less effort is required to effect cross-over of the shift lever from engagement with one shift yoke to engagement with the other.

A further object is to provide an improved interlock for the shift yokes whereby unintentional shift of one yoke is prevented while the other is in a shifted position.

A still further object is to provide an improved interlock at the top of the steering column for the shifting shafts whereby unintentional rotation thereof is prevented.

Other objects and advantages of my invention will be apparent from the following description taken in conjunction with the accompanying drawings which illustrate a preferred form of the invention.

In the drawings, Fig. 1 is a partial side elevation of a motor vehicle showing the transmission and shift mechanism.

Fig. 1A is a diagrammatic showing of the vehicle driving mechanism.

Fig. 2 is a plan view of the top of the steering column taken along the line 2—2 of Fig. 1.

Fig. 3 is a section along line 3—3 of Fig. 1.

Fig. 4 is a section along line 4—4 of Fig. 1.

Fig. 5 is a section along line 5—5 of Fig. 3.

Fig. 5A is an enlarged perspective view of the inner end of the gearshift lever.

Fig. 6 is a plan view of the transmission gear box, the casing thereof being broken away to show details.

Fig. 7 is a section along line 7—7 of Fig. 6 on an enlarged scale.

Fig. 8 is a section along the line 8—8 of Fig. 6.

Fig. 9 is a detail view of the interlock levers of the transmission.

Fig. 10 is a section along line 10—10 of Fig. 3.

Referring to Figs. 1 and 1A, it may be seen that the vehicle power plant comprises an engine A which is connected through the usual releasable clutch mechanism B to a change speed transmission C. The latter is connected by means of a propeller shaft 10 with the differential gear housing 11 and the road wheels 13 are driven from the differential by the drive axle shafts 12.

The transmission C has a casing 14 in which are mounted the usual transmission gear and clutch elements. The input pinion 15 drives the usual countershaft cluster 16 (Fig. 8) carried by a countershaft 17 and the driven shaft 18 has the low-reverse driven gear 19 slidably splined thereon, the latter being adapted for meshing with a low speed countershaft gear and a reverse idler gear in accordance with the conventional practice.

A second or intermediate speed driven gear 20 is journalled on the shaft 18 and carries a set of integral clutch teeth 21 which are adapted to be engaged by complementary teeth carried by a shiftable sleeve 22 slidably splined on the shaft 18. The sleeve 22 is also adapted to engage a set of clutch teeth 23 carried by the pinion 15.

The shaft 18 is adapted to be connected to the propeller shaft 10 by bolts 24, a parking brake structure 25 being operatively associated therewith as illustrated.

The arrangement of the transmission elements is such that forward shift of the gear 19 establishes low speed ratio and rearward shift thereof establishes reverse drive. The clutch sleeve 22 is adapted to establish direct drive upon forward shift thereof and second speed ratio upon rearward shift thereof.

The sleeve 22 has a groove 26 which is adapted to receive a shift yoke 27 carried by an arm 28 (Figs. 8 and 9). The arm is provided with an integral boss 29 which is adapted to be received by a boss 30 formed on the arm 28. The boss 29 has an internal bore in which is disposed a flanged cup 31. The latter carries a coil spring 32 and a ball 33 which is adapted to engage detent depressions 35 formed in the inner face of the cover 36. The cover 36 is secured to the casing 14 by cap screws 37 and carries the control mechanism as will be described.

The arm 28 is shaped somewhat like a bellcrank and has an integral angularly disposed portion 34 provided with a flange 38, the purpose of which will be later made apparent. The arm is carried by a shaft 39 journalled in a boss 40 formed in the cover 36. The shaft 39 is provided with a flange 41 at its inner end and flat portions 42 for non-rotatably receiving the boss 43 of arm 28 as illustrated.

The outer end of the shaft has a reduced flat portion 44 adapted to receive a lever 45, suitable fastening means 46 being provided. It may thus be seen that oscillation of the shaft 39 by swinging lever 45 will effect shift of the sleeve 22 in either direction from neutral to engage either the teeth 21 or the teeth 23. The detent ball 33 will yield to accommodate swinging of the arm 28 and will yieldably retain the sleeve in either of its shifted positions, there being three depressions 35 provided in accordance with conventional practice.

The low-reverse gear 19 is shifted by mechanism identical with that just described. A yoke 46 engages the shift collar 47 and is operated by an arm 48 carried by a shaft 49. A lever 50 is mounted on the outer end of the shaft for oscillating the same. The arm 48 has an angular extension 51 provided with a flange 52. As may be seen from Figs. 7 and 9, the flanges 38 and 52 of the arms 28 and 48 are respectively provided with recesses 53, 54. These recesses are so disposed with respect to each other that the portions 34 and 51 of the arms interlock with each other in all positions of operation.

When the sleeve 22 and gear 19 are in neutral, the recesses 53, 54 are in juxtaposition and either of the shift levers 45, 50 may be operated to establish a desired speed ratio. However, oscillation of either lever causes a corresponding displacement of the respective interlock arm portion and subsequent oscillation of the other lever is prevented because the recesses 53, 54 are no longer in registry. It is therefore impossible to effect shift of the sleeve 22 while the gear 19 is in one of its drive establishing positions and vice-versa.

Referring now to Figs. 1 to 5, it may be seen that the levers 45 and 50 connected by links 55, 56 to a pair of concentrically mounted bellcranks 57, 58. The latter are in turn connected by links 59 and 60 to levers 61 and 62 carried by the steering column structure, suitable rubber connections 63 being provided.

The steering column 64 carries the usual steering shaft 65 having a hand wheel 66 at its upper end. Mounted on the column 64 just below the hand wheel is a casing 67 which carries the actuating portion of the shift mechanism and a direction signal operating mechanism. The latter, indicated generally by numeral 68 is fully described and claimed in the copending application of Earl M. Muhleck, Serial No. 376,359, filed on January 28, 1941.

The casting 67 has a downwardly opening bore in which is rotatably carried a hollow shaft 69. A collar 70 is welded to shaft 69 for rotation therewith, a washer 71 being press-fitted in the casing to form a bearing. A second shaft 72 is disposed inside the hollow shaft 69, the two shafts being separated by a bushing 73 at the top thereof. The lower ends of the shafts 69 and 72 are supported on the steering column by a bracket 74 as illustrated in Fig. 4. The inner shaft 72 has a collar 75 pinned thereto above the bracket 74 and a collar 76 splined thereon below the bracket. The latter is welded to the lever 62 and the extreme lower end of the shaft 72 is threaded for receiving a nut 77 which retains the parts in assembly. The lever 61 is welded to the outer hollow shaft 69 and overhangs the shaft, the overhanging portion being received by the reduced portion 78 of the collar 75 whereby a simple and compact assembly is obtained.

The shaft 72 has a reduced upper end portion splined for a portion of its length for the reception of an internally splined collar 79. The collar 79 is shown in plan in Fig. 5 and is identical in shape with the collar 70, carried by the shaft 69. The collar 79 has a pair of lugs 80 formed thereon, the slot 81 between these lugs being adapted to receive the upper lug 82 of the gear shift lever 83. The collar 70 has a similar slot 84 for receiving the lower lug 85 of the lever.

The gear shift lever is formed at its inner end as shown in Fig. 5A, the bore 86 thereof being larger than the shaft 72 to permit rocking of the lever. A hardened washer 87 is seated in a suitable countersunk depression formed in the collar 70 as illustrated in Fig. 3, this washer also seating on the top edge of the larger portion of the shaft 72 and forming an abutment for the shaft 69 and the bushing 73. The rounded portions 88 of the lever 83 are adapted to engage the washer 87 and the bottom surface of the collar 79 respectively, a pin 89 securing the collar 79 to the shaft 72 thereby to retain the parts in assembled relation. It will be apparent that the lever 83 may then be rocked on the rounded portions 88 to selectively engage the lugs 82, 85 with the slots 81, 84, whereupon the shafts 69 and 72 are selectively oscillatable.

In order to prevent oscillation of one of the shafts while the other is being operated, an interlock plate 90 is provided. This plate, more clearly shown in Fig. 10 is of arcuate shape (see Fig. 5) and has oppositely disposed pins 91, 92 formed integrally thereon. A rectangular opening 93 accommodates swinging of the shift lever 83. The pins 91, 92 each have an axial bore in which are disposed coil springs 94, 95, the springs acting between the pins and the bottoms of the bores 96, 97 formed in the casing 67 for receiving the pins.

As can be readily seen in Fig. 3, the plate 90 is so disposed with respect to the other parts of the mechanism that the upper and lower portions thereof are adapted to function as tracks on which the lugs 82, 85 of the lever 83 may slide during swinging of the lever. Also, the pins 91, 92 are so disposed that the pin 91 is engaged with the collar 79 when lug 85 of lever 83 is engaged with collar 70, and pin 92 is engaged with collar 70 when lug 82 is engaged with collar 79. Thus, it is seen that a positive interlock is provided which prevents unintentional rotative movement of either of the shafts 72, 69.

The springs 94, 95 act to make the plate 90 sensitive to up and down movement of the lever. It is preferred to make the spring 94 relatively stronger than the spring 95 so that the lever 83 will be urged at all times into engagement with the linkage controlling the sleeve 22, as illustrated in Fig. 3.

By providing two interlocks, one for the shift linkage and one for the transmission yokes, locking up of the transmission shift mechanism is rendered virtually impossible and rapid and easy shifting is facilitated.

The operation of the device is as follows: The parts are shown in their neutral position and assuming that the vehicle engine A is operating and the driver wishes to place the vehicle in motion for normal acceleration, he first depresses the clutch pedal D in the usual manner and grasps the knob on the end of the gear shift lever 83 and rocks the lever upwardly about the axis of the rounded portions 88 thereby to engage the lug 82 with the slot 81 of the collar 79. As the lever 83 is rocked upwardly, the interlock plate 90 is moved upwardly, the spring 94 being compressed and the pin 92 moves into engagement with the collar 70 while at the same time the pin 91 moves out of engagement with the collar 79. The lever 83 is then swung clockwise of the axis of the shafts 69, 72, which action rotates the shaft 72 clockwise and through the intermediary of the lever 62, link 60, bellcrank 58, link 56 and lever 50, shaft 49 is rotated counterclockwise and low speed gear 19 is shifted into engagement with the low speed gear of the countershaft (not shown) customarily provided. Release of the clutch pedal D and depression of the accelerator pedal E will now cause the vehicle to be driven in first or low speed ratio.

Shift of the transmission to second or intermediate speed ratio is accomplished by swinging of the lever 83 in a counterclockwise direction while at the same time biasing the lever toward its lower path of movement. When the lever reaches neutral position, the pin 91 of the interlock plate 90 will drop into the slot 81 of the lug 79 to thereby lock the same against further movement and the lug 85 of the lever 83 will engage the slot 84 of the collar 70. Further movement of the lever 83 in a counterclockwise direction will then effect rotation of the hollow shaft 69 which in turn will effect clockwise rotation of the shaft 39 through the intermediary of the lever 61, link 59, bellcrank lever 57, link 55 and lever 45. Clockwise rotation of the shaft 39 will shift the sleeve 22 into engagement with the clutch teeth 21 of the intermediate speed gear 20 and the vehicle is now ready to be accelerated into second or intermediate speed ratio.

This shift to direct drive is accomplished in a similar manner by clockwise swinging of the lever 83 while holding the same in its lower path of movement, this action effecting clockwise rotation of hollow shaft 69 which, through the intermediary of the various links and levers, effects shift of sleeve 22 with the clutch teeth 23 of the main drive pinion 15.

Reverse drive is established in a manner similar to that described above by counterclockwise swinging of the shift lever 83 while the same is held in its upper path of movement with the lug 82 thereof in engagement with the slot 81 of the collar 79. During the time that the transmission is in low or reverse drive, movement of the yoke 27 is prevented by engagement of the flanged portion 52 of the interlock arm 51 with the slot 53 of the arm 34. Likewise, during the time that the transmission is in second or direct drive, movement of the yoke 46 is prevented by engagement of the flanged portion 38 of the arm 34 with the slot 54 of arm 51.

It may thus be seen that I have provided a simple and fool-proof transmission and control mechanism therefor with separate interlocking means for the shiftable members in the transmission and the respective control mechanisms associated therewith, the control mechanism being so arranged that the cross-over effort is greatly reduced and a positive linkage is provided for each of the shifting motions.

I claim:

1. In a transmission control mechanism, a rotatable hollow shaft; a casing journalling said shaft; a second shaft disposed within said hollow shaft and having a portion extending outwardly thereof; means journalling the two shafts for relative rotation; a pair of collars fixed respectively to said shafts and disposed in spaced relationship; a shift lever having a portion loosely surrounding said second shaft between said collars having rounded surfaces thereon for rockably engaging the juxtaposed surfaces of said collars; said respective collars being provided with slots and said lever having lugs formed thereon for selectively engaging said slots upon rocking thereof whereby one or the other of said shafts may be rotated by swinging of said lever about the axis of said shafts; and means for selectively locking said shafts against rotation whereby simultaneous rotation thereof is prevented, said means including spring loaded means acting to normally maintain one of said shafts locked in neutral position.

2. In a motor vehicle power transmission, a pair of members adapted to be shifted to establish a plurality of speed ratio drives; shift yokes for shifting said members; a pair of arms respectively carrying said yokes; said arms being journalled for oscillation about spaced axes and having interengaging portions; the interengaging portion of each arm comprising a flange having a slot therein; the said arms being so constructed and arranged that the respective slots are in juxtaposition when the arms are in their neutral position and the flanged portion of one arm is engaged with the slot of the other arm when said one arm is in a drive establishing position.

FREDERIC W. SLACK.